(12) United States Patent
Regupathy et al.

(10) Patent No.: US 11,157,289 B2
(45) Date of Patent: Oct. 26, 2021

(54) POWER MANAGEMENT METHOD AND APPARATUS FOR VIRTUALIZED I/O DEVICES

(71) Applicant: Intel Corporation, Santa Clara, CA (US)

(72) Inventors: Rajaram Regupathy, Bangalore (IN); Saranya Gopal, Bangalore (IN); Peter Ewert, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 16/410,689

(22) Filed: May 13, 2019

(65) Prior Publication Data

US 2019/0272181 A1    Sep. 5, 2019

(51) Int. Cl.
| | |
|---|---|
| *G06F 9/4401* | (2018.01) |
| *G06F 9/455* | (2018.01) |
| *G06F 1/3234* | (2019.01) |
| *G06F 13/42* | (2006.01) |

(52) U.S. Cl.
CPC .......... *G06F 9/4418* (2013.01); *G06F 1/3278* (2013.01); *G06F 9/45533* (2013.01); *G06F 13/4282* (2013.01); *G06F 2213/0042* (2013.01)

(58) Field of Classification Search
CPC ............. G06F 9/45533; G06F 9/45545; G06F 9/45558; G06F 2009/45579; G06F 2009/45575; G06F 9/4555; G06F 21/53; G06F 2009/45583; G06F 1/3287; G06F 1/3203; G06F 21/85; G06F 2212/151

USPC .............................. 718/1, 104, 108; 713/323
See application file for complete search history.

(56) References Cited

U.S. PATENT DOCUMENTS

| | | | |
|---|---|---|---|
| 10,394,585 B2* | 8/2019 | Hoppert ................. | G06F 3/0644 |
| 2002/0124194 A1* | 9/2002 | Dawkins ................. | G06F 9/442 |
| | | | 713/310 |
| 2009/0327774 A1* | 12/2009 | Jeyaseelan ............ | G06F 1/3203 |
| | | | 713/320 |
| 2010/0162022 A1* | 6/2010 | Kim ........................ | G06F 1/266 |
| | | | 713/324 |
| 2012/0102348 A1* | 4/2012 | Muralidhar ......... | G06F 9/45533 |
| | | | 713/323 |
| 2014/0173600 A1* | 6/2014 | Ramakrishnan Nair .................... | |
| | | | G06F 9/4555 |
| | | | 718/1 |
| 2016/0203012 A1* | 7/2016 | Dong .................... | G06F 9/4893 |
| | | | 718/1 |

(Continued)

*Primary Examiner* — Faisal M Zaman
(74) *Attorney, Agent, or Firm* — Schwabe, Williamson & Wyatt, P.C.

(57) ABSTRACT

In embodiments, at least one computer-readable medium (CRM) includes a plurality of instructions to cause a computing device, in response to execution of the instructions, to operate a power manager to: receive a request from a first operating system (OS) of a virtualized execution environment (VEE) of the computing device to suspend a first input/output (I/O) device of the computing device. The computing device has a plurality of I/O ports for receiving a plurality of I/O devices including the first I/O device. The plurality of I/O ports are virtualized for a plurality of OSes of the VEE, including the first OS. In response to the receipt, the power manager conditionally suspends the first I/O device if no other guest OS of the VEE is using the first I/O device. Other embodiments are also described and claimed.

13 Claims, 8 Drawing Sheets

(56) References Cited

U.S. PATENT DOCUMENTS

| | | | | |
|---|---|---|---|---|
| 2017/0109310 A1* | 4/2017 | Takahashi | ............ | G06F 9/45545 |
| 2017/0116151 A1* | 4/2017 | Takahashi | ............. | G06F 13/102 |
| 2017/0147378 A1* | 5/2017 | Tsirkin | ................ | G06F 9/45558 |
| 2019/0311141 A1* | 10/2019 | Brehove | ................ | G06F 21/604 |
| 2020/0167247 A1* | 5/2020 | Tsirkin | ................ | G06F 11/2025 |
| 2020/0249976 A1* | 8/2020 | Tateno | ................ | G06F 9/45558 |

* cited by examiner

```
Guest OS no longer using the virtualized I/O device
502
                    │
                    ▼
Guest OS requests the Power Manager to suspend the
virtualized I/O device 504
                    │
                    ▼
The Power Manager checks if any other OS is using the
virtualized I/O device 506
                    │
                    ▼
The Power Manager decides to supsend the virtualized I/O
device if no OS is using it 508
                    │
                    ▼
The Power Manager then broadcasts its decision to suspend
the virtualized I/O device to all OS 510
                    │
                    ▼
The virtualized I/O device is suspended 512
                    │
                    ▼
The Power Manager broadcasts the suspend event to all OS
514
```

POWER MANAGEMENT METHOD AND APPARATUS FOR VIRTUALIZED I/O DEVICES

TECHNICAL FIELD

The present disclosure relates to the field of computing. More particularly, the present disclosure relates to power management method and apparatus for virtualized input/output (I/O) devices, e.g., virtualized universal serial bus (USB) devices in a virtualized execution environment (VEE) with multi-virtual machines (VMs) or multi-containers.

BACKGROUND

The background description provided herein is for purpose of generally presenting the context of the disclosure. Unless otherwise indicated herein, the materials described in this section are not prior art to the claims in this application and are not admitted to be prior art by inclusion in this section.

With advances in integrated circuit and computing technologies, increasingly computing devices are packed with more and more computing power. Frequently, modern computing devices would have multiple I/O devices, and the multiple I/O devices are virtualized for shared usage by various concurrently executing processes in a VEE, such as VMs or containers. Managing power consumption by the various I/O devices may be essential for optimizing the overall platform power consumption, especially for mobile computing. For example, many computing devices would support multiple USB devices of the same or different USB generations, virtualized for shared usage by the various concurrently executing VMs or containers. Managing power consumption of the various USB devices may be essential for optimizing the overall platform power consumption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

To address challenges discussed in the background section, apparatuses, methods and storage medium associated with power management of virtualized I/O devices in a VEE with multi-VMs or multi-containers are disclosed. In various embodiments, a computer readable medium (CRM) is provided with a plurality of instructions to cause a computing device hosting a VEE, in response to execution of the instruction, to operate a power manager to receive a request from a first guest operating system (OS) of the VEE to suspend a first I/O device of the computing device. The computing device has a plurality of I/O ports for receiving a plurality of I/O devices including the first I/O device; further, the plurality of I/O ports/devices are virtualized for the plurality of OSes of the VEE, including the first OS. In response to the receipt, the power manager conditionally suspends the first I/O device if no other OS of the VEE is using the first I/O device.

In various embodiment, the power manager is to further receive a request from a second guest OS of the VEE, after the first I/O device has been suspended, to use the suspended first I/O device. In response to the request to use the suspended first I/O device, resume the first I/O device, and on resumption, broadcast the resumption of the first I/O device to all OSes of the VEE.

In various embodiments, the plurality of I/O ports are Universal Serial Bus (USB) ports, and the plurality of I/O devices are USB devices.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
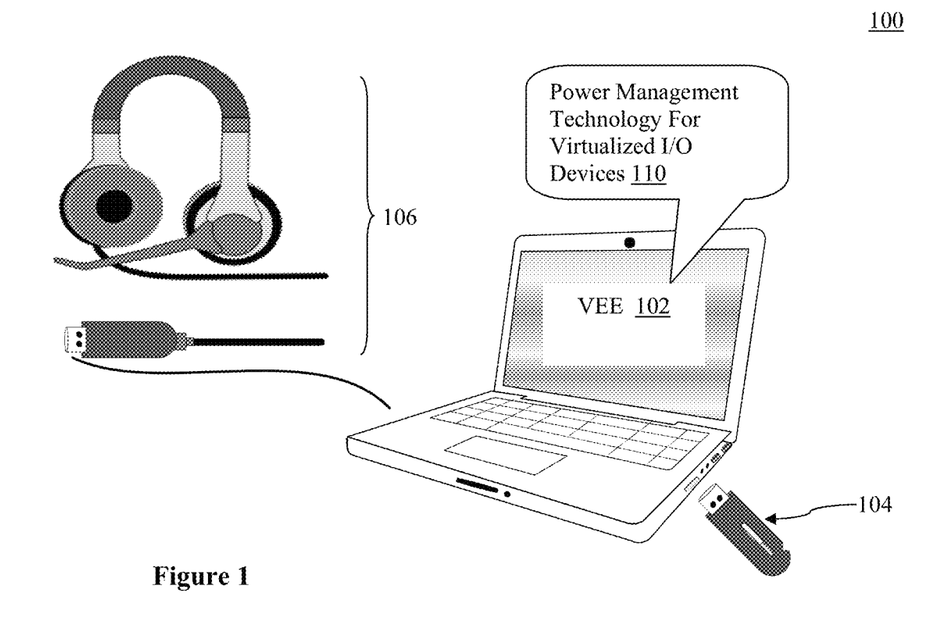
FIG. 1 illustrates an overview of a computing device having multiple I/O devices virtualized for shared usage by concurrent executing applications in a VEE with the power management technology of the present disclosure, in accordance with various embodiments.

Referring now to FIG. 1, wherein an overview of a computing device having multiple I/O devices virtualized for shared usage by concurrent executing applications in a VEE, incorporated with the power management technology of the present disclosure, in accordance with various embodiments, is shown. As illustrated, computing device 100 is arranged to host virtualized execution, where the hardware elements, such as processors (not shown), memory and storage (not shown), and I/O devices 104 and 106 are virtualized for shared usage by concurrently executing applications within VEE 102. Computing device 100 includes a number of I/O ports (not shown) for removably receiving I/O devices 104 and 106. Further, computing device 100 is equipped with the power management technology of the present disclosure to manage power consumption of I/O devices 104 and 106 to substantially contribute to the overall effectiveness of power management of computing device 100.

VEE 102 may include a number of VMs or a number of containers. The term VM, as used herein, refers to an instance of a software emulation of the hardware of computing device 100. Each VM includes a guest operating system (OS) arranged to manage execution of the various programs or applications within the VM. Some of the programs or applications may access or use I/O devices 104 and/or 106, from time to time. In various embodiments, VEE 102 may further include a VM Manager (VMM) or hypervisor (not shown) to manage the concurrent execution of the various VMs. The term container, as user herein, refers to a unit of software that packages up code and all its dependencies so the unit of software can run quickly and reliably from one computing environment to another. In various embodiments, VEE 102 may further include a docker 108 to manage the concurrent execution of the various containers. An example of VEE 102 will be further described later with references to FIG. 2.

For the embodiments of FIG. 1, for ease of understanding, two I/O devices 104 and 106, a removable flash drive and a headset are illustrated. However, the present disclosure is not so limited. In various embodiments, computing device 100 may have more than two I/O devices 104 and 106. Further, I/O devices 104 and 106 may be of the same or different types (including the same type but of different generations). In general, I/O devices 104 and 106 may be any one of a number of I/O devices known in the art, including but are not limited to keyboard, mouse, external storage, camera, headset, microphone, and so forth.

In various embodiments, depending on the I/O device, either computing device 100 or the I/O device 104/106 itself, can initiate suspension to save power consumption. Power management technology 110 is arranged to manage the suspension of I/O device 104 and 106, allowing the I/O devices 104/106 to be suspended when it is truly not used by any of the applications of VEE 102. Power management technology 110 and related topics will be further described below with references to FIG. 2-6.

For ease of understanding, a laptop computer is illustrated for computing device 100 in FIG. 1, however, the present disclosure is not so limited. In other embodiments, computing device 100 may be a smartphone, a computing tablet, a desktop, a server, a set-top box, a game console, and so forth. An example architecture/component arrangement of computing device 100 will be further described later with references to FIG. 7.

Figure 2:
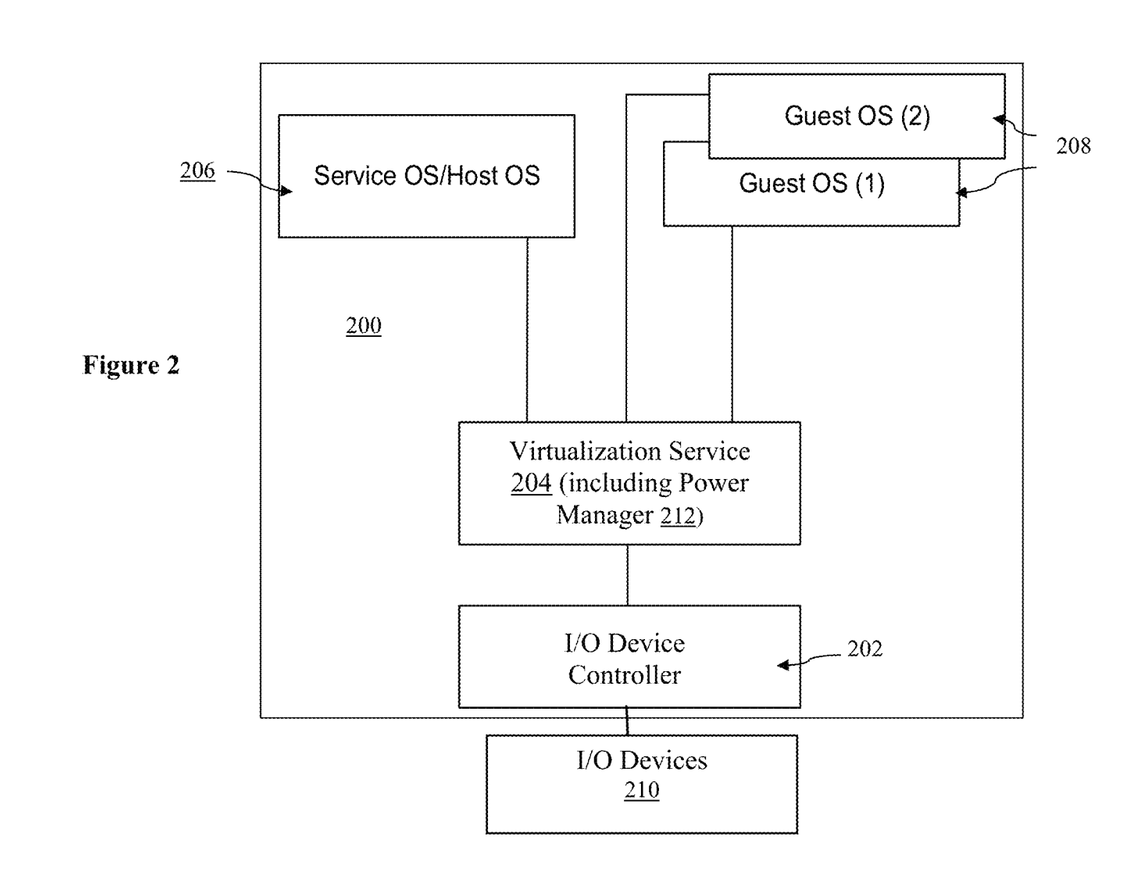
FIG. 2 illustrates a component view of an example VEE with power management technology of the present disclosure, according to various embodiments.

Referring now FIG. 2, wherein a component view of an example VEE, according to various embodiments, is illustrated. As shown, for the illustrated embodiments, VEE 200, which may be VEE 102 of computing device 100, includes a service OS (also may be referred to as Host OS) 206, a number of Guest OSes 208, and I/O device controller 202. Further, VEE 200 includes a virtualization service 204 having in particular, a power manager 212 incorporated with the teachings of the present disclosure.

I/O devices 210, as I/O devices 104 and 106 earlier described for FIG. 1, are virtualized by virtualization service 204 for shared usage by applications of OSes 206 and 208. Like, IO devices 104 and 106, I/O devices 210 may be any one of a number of I/O devices known in the art, including but are not limited to, USB or Thunderbolt, keyboards, mice, external storage, headsets, microphones cameras, and so forth, of the same or different types (including of the same type but of different generations). In other words, some or all of I/O devices 210 may be equipped to initiate a request to being suspended to save power consumed by virtualization environment 200.

I/O controller 202 is arranged to control operations of the I/O devices 210. Like I/O devices 210, I/O controller 202 may be any one of a number of corresponding I/O controllers, USB, Thunderbolt, and so forth.

Service OS 206 and Guest OSes 208 may likewise be any one of a number of OSes known in the art, including but are not limited to Linux, from e.g., Ubuntu of UK, Window® from Microsoft of Redmond, Wash., Android from Google of Mountain View, Calif. In various embodiments, Service OS 206 and Guest OSes 208 may respectively be part of a VM or part of a container.

Virtualization Service 204 is arranged to virtualized various hardware resource of VEE 200 for the shared usage by OS 206-208 and their applications, including but are not limited to processors (not shown), memory and storage (not shown) and I/O devices 210. Virtualization service 204, except for power manager 212, may be any one of a number of virtualization services known in the art. In various embodiments, virtualization service 204 may be part of a VMM or hypervisor.

Power manager 212 as alluded to earlier is arranged to manage the power consumption of virtualized I/O devices 210. In particular, power manager 212 is arranged to receive request to suspend one of virtualized I/O devices 210 to save power consumption. The request may be from the I/O device 210 or from one of the OSes 206 and 208. In response, power manager 212 would determine whether the virtualized I/O device 210 is indeed not used by any of the OSes 206-208, and only on determination that the virtualized I/O device 210 is indeed not used by any of the OSes 206-208, would power manager 212 cause the particular virtualized I/O device 210 to be suspended (e.g., through I/O controller 202). Further, in various embodiments, on causing the particular virtualized I/O device 210 to be suspended, power manager 212 would broadcast the suspension of the particular virtualized I/O device 210 to all OSes 206-208.

Additionally, power manager 212 is arranged to receive a request from one of the OSes 206-208 to resume a previously suspended I/O device 210. In response, power manager 212 would resume the particular I/O device 210. And on resumption of the particular I/O device 210, power manager 212 would broadcast the resumption of the particular I/O device 210 to all OSes 206-208.

As described earlier, in various embodiments, I/O devices 104/106 or 210 may be USB devices removably received by USB ports (not shown) of VEE 102 or 200. USB was designed to standardize the connection of peripherals like keyboard, mouse, web cameras, headset, mass storage devices, etc. to a wide variety of systems like personal computing devices, mobile phones and car infotainment systems. The specifications for USB cables, connectors and protocols for connection, communication and power supply are currently maintained by USB Implementers Forum (USB IF). With USB being the primary medium of transport found in majority of the systems today, managing USB power may be essential for optimizing the overall platform power consumption. Thus, in the description to follow, power management technology 110 for virtualized I/O device (e.g., power manager 212) will be particularly described in the context of virtualized USB I/O devices. However, the present disclosure is not so limited, and may be practiced with other I/O devices, such as, but are not limited to Thunderbolt and other I/O devices.

In the case of USB, the complexity of power management comes in part from the necessity to handle multiple cases including power management based on the port type (USB 2.0, USB 3.0 or type C) and the port role (device mode or host mode), functional power management based on the device function and port power management in the case of a USB hub.

A potential important point to note about an USB ecosystem is that USB Link Power Management (LPM) differs based on USB port type. In a USB 2.0 port, the transition to a low power state can be initiated only by the host device. However, in case of a USB 3.0 port, the transition to a low power state can be initiated by both the device and the host. Also, USB 3.0 includes an additional link power state for a fast exit from the low power mode. The key characteristics of the link power management states and their latencies for entry and exit are shown in Table 1 below for USB 2.0 and Table 2 below for USB 3.0.

TABLE 1

USB 2.0 Link States

| Link State | L1 | L2 |
| --- | --- | --- |
| Entry | Explicitly entered via LPM extended transaction | Implicitly entered via 3 ms of link inactivity |
| Exit | Device or host-initiated via resume signaling; Remote-wake can be (optionally) enabled/disabled via the LPM transaction. | Device- or host-initiated via resume signaling; device-initiated resumes can be (optionally) enabled/disabled by software |
| Latencies | Entry: ~10 µs<br>Exit: ~70 µs to 1 ms (host-specific) | Entry: ~3 ms<br>Exit: >30 ms (OS-dependent) |

TABLE 2

USB 3.0 Link States

| Link State | Description | Key Characteristics | Device Clock | Exit Latency |
| --- | --- | --- | --- | --- |
| U0 | Link active | | On | N/A |
| U1 | Link idle, fast exit | Receiver (RX) & Transmitter (TX) quiesced | On or off | µs |
| U2 | Link idle, slow exit | Clock gen circuit also quiesced | On or off | µs-ms |
| U3 | Suspend | Portions of device power removed | Off | ms |

Another potential important point to note about an USB ecosystem is that in USB 3.0 the LPM can extend to functional level in case of certain devices. For example, a use case like audio playback, it is possible to put the microphone circuit to a deep sleep state. Following is an excerpt from the USB Audio Class 3.0 specification that discusses how functional power management can be implemented for an audio device:

A Power Domain is defined as a zone within the Audio Function that groups one or more Entities and allows the Host to control power consumption levels for that Domain. This way, the Host can potentially switch parts of the Audio Function to lower power states when these parts are currently not in use, leading to an overall decrease in power consumption. As an example, a USB headset may have two separate Power Domains, one for the output-related functionality (headphone) and one for the input-related functionality (microphones). When the headset is used to simply listen to music, the input-related functionality may be temporarily switched to a lower power state (or even completely off) to conserve power. This is especially important if the headset is used in conjunction with a battery-powered device, such as a mobile phone or MP3 player, where extending battery life is important.

In the case of a USB hub, port level power management plays a vital role in managing USB power in an efficient way. The host can suspend a device by issuing a 'set feature' command to suspend the particular port in the hub to which the device is connected. The host can resume a device by issuing a 'clear feature' command to the same port.

In many VEEs, there will be multiple USB ports catering to a wide variety of use cases like USB mass storage for accessing external files, USB headset to listen to music and attend phone calls, USB web cameras, device mode debug capability, etc. The USB ports are typically shared between multiple operating systems in a virtualized system. USB virtualization can either be a 'full virtualization' or a 'pass-through' virtualization. In case of the full virtualization, any Guest OS can access any USB port and the ports will be dynamically allocated to the Guest OS by the Host OS. Host OS has control of the port and only data flow is virtualized. On the other hand, in case of the 'passthrough' mode, a port will be dedicated to a particular Guest OS. The port can either be host-mode or device port and can switch between the host and the device mode depending on the use case. In this passthrough mode, the Host OS has no control on the port leaving the Host OS in undecidable condition due to lack of information.

In a typical Linux environment, when the USB device is no longer used by an application, the USB device driver reduces its usage counter by calling the usb_autopm_put_interface( ) call. When the usage counter reaches 0, the USB core attempts to auto-suspend the USB device. When the roothub driver receives the PORT_SUSPEND command, it writes into extensible host controller interface (XHCI) register to put the link state to U3, thereby suspending the port to which the device is connected. Note that kernel can attempt to suspend a USB device only if it has knowledge on whether its interfaces are currently unused.

Consider the following scenario where a USB headset is connected to a Chromebook to play music from an Android application running as a virtualized solution in the Chromebook. The Android application in a container can use the USB headset to play music. The USB headset device is shared to Android container application from Host OS. Android does not directly interact with USB Host driver in kernel and it simply uses the full virtualized USB device in its application. Because of this, the Android audio application and kernel do not have any control on putting the device in the suspend mode. This will lead to unnecessary wastage of power. Additional problem with incorrect USB LPM in a virtualized system is that it will lead to data loss or data corruption when the guest OS suspends and resumes.

Consider another scenario where an Android Debug Bridge (ADB) solution is running in Android guest OS in as a pass-through solution. The Android guest OS (In-vehicle infotainment unit) runs ADB daemon for debugging. The device mode port of the automotive system is connected via cable to another host machine. The USB device mode works in 'hardware pass-through mode' where the device mode drivers of the Android guest OS directly interact with the extensible device controller interface (XDCI) controller. The Service OS which controls the majority of the platform does not know whether the XDCI controller is suspended since it does not know if any guest OS is still using the device mode port. This lack of information in the Service OS leads to inefficient management of power or data loss leading to bad user experience.

The power management technologies of the present disclosure addresses these and other issues, enabling a computing device hosting a VEE with multi-VMs or multi-containers environment to effectively manage the suspension/power consumption of its virtualized I/O devices. These and other aspects will be further described below with references to FIGS. 3-6.

Figure 3:
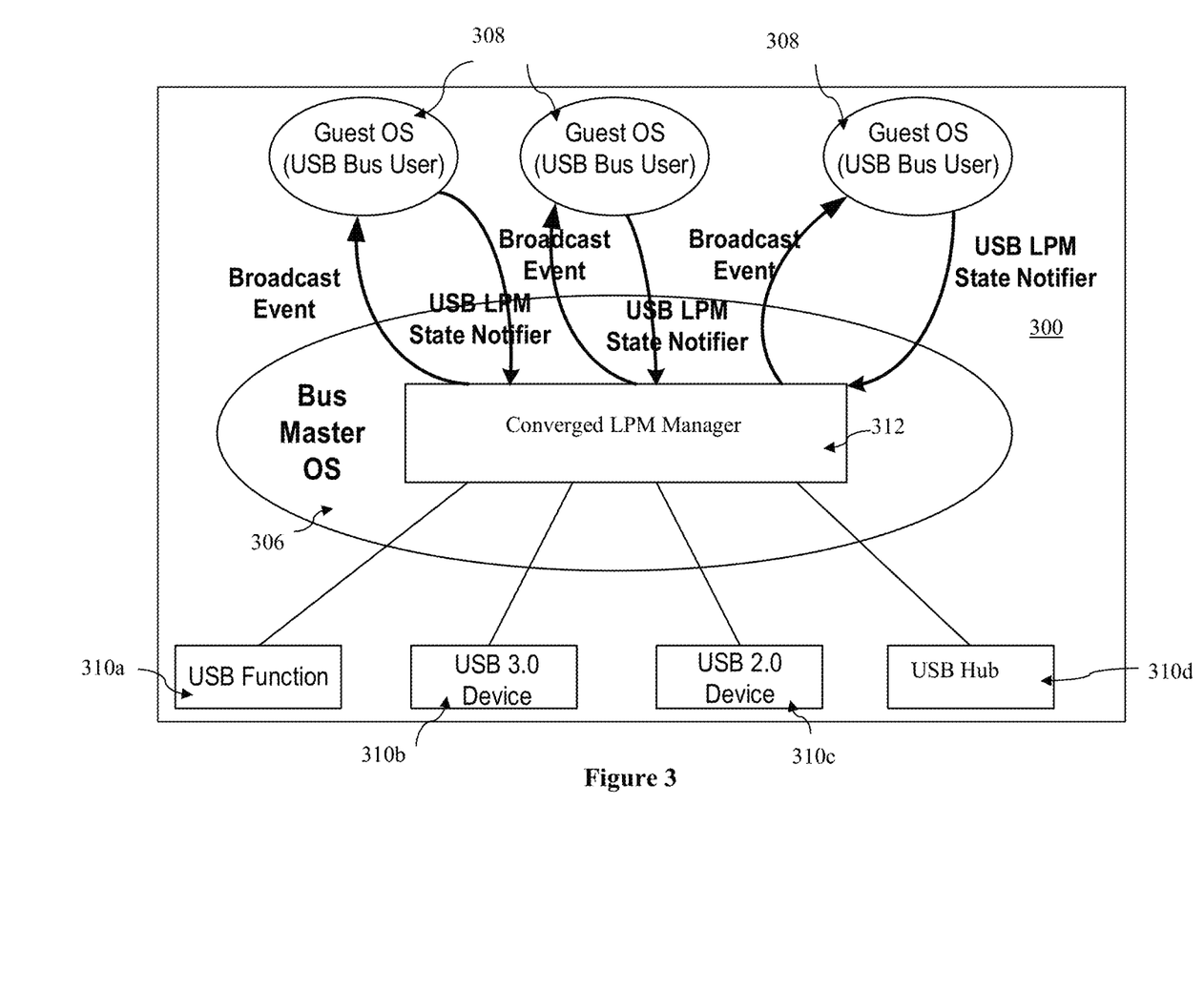
FIG. 3 illustrates a software view of another example VEE with power management technology of the present disclosure, according to various embodiments.

Referring now to FIG. 3, wherein a software view of an example VEE with virtualized USB devices, according to various embodiments, is illustrated As shown, for the illustrated embodiments, VEE 300, which may be VEE 102 of computing device 100 or VEE 200 of FIG. 2, includes an OS 306 having the USB bus master, and a number of Guest OSes 308, each having a number of USB bus users. The bus master OS 308 includes a converged link power management (LPM) manager 312, which may corresponds to power manager 212 of FIG. 2, to manage various virtualized USB device or functions 310a-310d. For the illustrated embodiments, virtualized USB devices or functions 310a-310d may include virtualized USB function 310a, virtualized USB 3.0 device 310b, virtualized USB 2.0 device 310c, and virtualized USB hub 310d. Accordingly, OSes 306-308, as well as some virtualized USB devices/functions, such as virtualized USB 3.0 device 310b may initiation suspension to save power consumption.

Similar to service OS 206 and Guest OS 208, OSes 306-308 may likewise be any one of a number of OSes known in the art, including but are not limited to Linux, from e.g., Ubuntu of UK, Window® from Microsoft of Redmond, Wash., Android from Google of Mountain View, Calif. In various embodiments, OSes 306-308 may respectively be part of a VM or part of a container.

Converged LPM manager 312, as power manager 212, are arranged to manage the power consumption of virtualized USB devices/functions 310a-310d. In particular, converged LPM manager 312 are arranged to receive LPM state notifications from OSes 306-308 to suspend one of virtualized USB devices/functions 310a-310d to save power consumption. As described earlier, in response, converged LPM manager 312 would determine whether the virtualized USB device/function 310a-310d is indeed not used by any of the OSes 308, and only on determination that the virtualized USB device/function 310a-310d is indeed not used by any of the OSes 308, would converged LPM manager 312 cause the particular USB device/function 310a-310d to be suspended. Further, in various embodiments, on causing the particular USB device/function 310a-310d to be suspended, converged LPM manager 312 would broadcast the suspension of the particular USB device/function 310a-310d to all OSes 306-308.

Additionally, converged LPM manager 312 is arranged to receive a request from one of the OSes 206-208 to resume a previously suspended USB device/function 310a-310d. In response, converged LPM manager 312 would resume the particular virtualized USB device/function 310a-310d. And on resumption of the particular virtualized USB device/function 310a-310d, converged LPM manager 312 would broadcast the resumption of the particular virtualized USB device/function 210 to all OSes 306-308.

In alternate embodiments, in lieu of being located at host OS 206, converged LPM manager 312 may be part of a VMM or hypervisor. When the converged LPM manager 312 resides in a hypervisor, it may emulate a virtual register representing the port status to the host OS 306 and the guest OS 308 and trap the writes into this virtual register. The converged LPM manager 312 may then decide to put the USB link to a low power state or initiate USB suspend if it does not affect any of OS 306-308. Alternatively, converged LPM manager 312 may maintain a registry or an internal state machine. Guest OS 308 may send requests to change the link state to a low power mode to converged LPM manager 312 via broadcast sockets. Broadcast sockets may enable inter-process communication across OS boundaries. Further, converged LPM manager 312 may notify host OS 206 on USB link state to indicate a low power mode if it decides no conflict with any of the registered OSes.

Similarly request may be sent by one of the guest OSes 308 to resume a virtualized USB device/function 310a-310d, and converged LPM manager 312 may make the final decision to resume based on the current status of the USB link across all OSes. Thereafter, converged LPM manager 312 may broadcast the 'link state change' events to all OSes 306-308.

In various embodiments, the converged LPM manager 312 can be a user space daemon listening to link power state change requests from guest OS 308 and enabling auto suspend feature by writing into kernel sysfs interfaces of host OS 306. Alternatively, it can also be a master driver in host OS 306 which exposes system interface extensions for guest OS 310 to request change in link state. As a master kernel driver, it can decide to suspend or resume the virtualized USB device/function 310a-310d based on the USB port's status across all OSes 306-308 and initiate suspend and resume by writing into port status registers of the USB controller.

Figure 4:
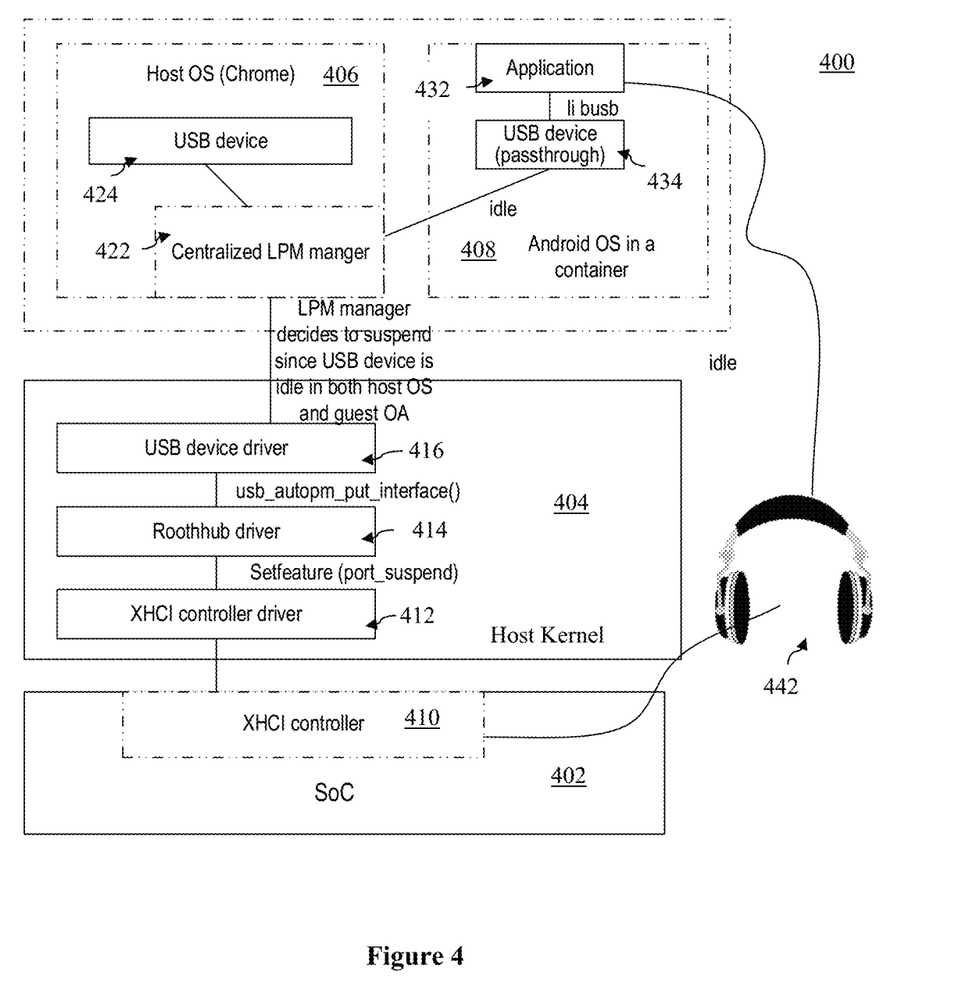
FIG. 4 illustrates an example use case scenario of the present disclosure.

Referring now to FIG. 4, wherein an example use case scenario, according to various embodiments, is illustrated. As shown, for the illustrated embodiments, VEE 400 includes virtualized hardware resources (system-on-chip (SOC)) 402, host kernel 404, host OS 406 and container 408. SOC 402 includes XHCI controller 410. Host kernel 404 includes XHCI driver 412, roothub driver 414 and USB device driver 416. Host OS 406, which may be a chrome OS, includes centralized LPM manager 422 and USB device 424. Container 408 may include an Android OS hosting example application 432 and USB device 434 (in pass-through mode). Example application 432 uses virtualized USB headset 442. Example application 432 may be an application that play media, such as music As described earlier for power manager 212 of FIG. 2 and converged LPM manager 312 of FIG. 3, centralized LPM manager 422 is arranged to manage the power consumption of virtualized USB devices/functions, including virtualized USB headset 442. In response to a request to suspend a virtualized USB device/function, as described earlier, centralized LPM manager 422 would suspend the virtualized USB device/function, only on determination that neither host OS 406 nor container 408 is using the virtualized USB device/function.

Thus, when the music stopped playing in example guest OS application 432, guest OS 408 would send a broadcast message to centralized LPM manager 422 to suspend USB headset 442. When USB headset 442 is not in use by Host OS 406, it also requests centralized LPM manager 422 to suspend USB headset 442. Now, centralized LPM manager 422 has information on the USB device's state from both Host OS 406 and Guest OS 408, i.e., headset 442 is not in use in both host OS 406 and guest OS 408, centralized LPM manager 422 would now decide to suspend the USB headset 442. On suspension, as described earlier, centralized LPM manager 422 would broadcast the suspension to both OSes 406 and 408. When either OS 406 or 408 needs the USB headset again, it would send a notify message to centralized LPM manager 422, and centralized LPM manager 422 would initiate resume for of the USB headset 442. Similarly, on resumption, as described earlier, centralized LPM manager 422 would broadcast the suspension to both OS 406 and 408.

For the illustrated embodiments, to suspend the virtualized USB headset 442, centralized LPM manager 422 may cause USB device driver 416 of host kernel 404 to call usb_autopm_put_interface( ) of roothub driver 414 of host kernel 404. Roothub driver 414 in turn may call Setfeature (port_suspend) of XHCI driver 412 of host kernel 404.

Figure 5:
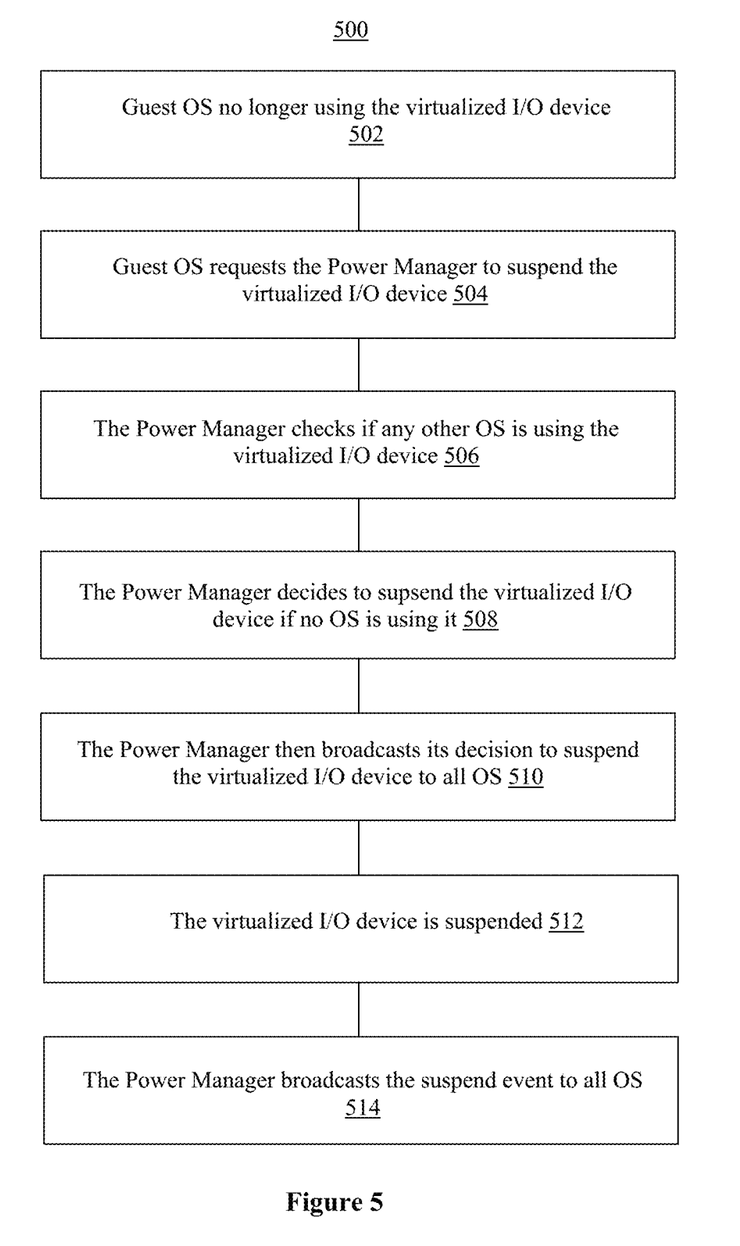
FIGS. 5-6 illustrate an example power management process, according to various embodiments.
Figure 6:
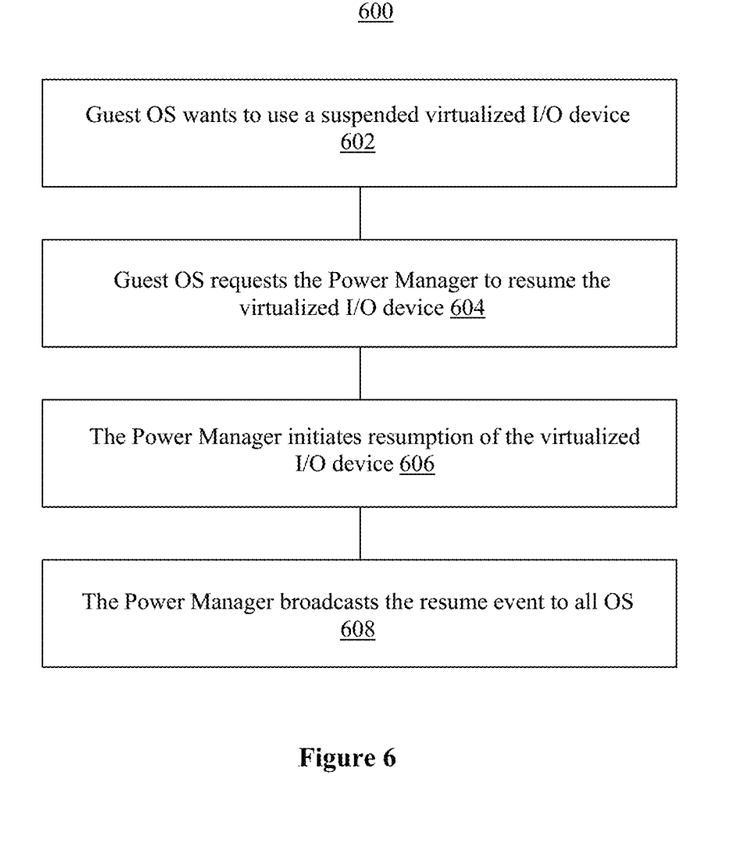

Referring now to FIGS. 5-6, wherein an example set of processes for managing power management power consumption of I/O devices in a VEE, according to various embodiments, is illustrated. More specifically, FIG. 5 illustrates an example process 500 for suspending a virtualized I/O device in a VEE, and FIG. 6 illustrates an example process 600 for resuming the virtualized I/O device in a VEE. As shown, process 500 includes operations performed at blocks 502-514, whereas process 600 includes operations performed at blocks 602-608. Various ones of these operations may be performed e.g., by power manager 212 of FIG. 2, converged LPM manager 312 of FIG. 3, or centralized LPM manager 422 of FIG. 4. In alternate embodiments, process 500 or 600 may include more or less operations, or with some of the operations performed in different order.

Process 500 starts at block 502. At block 502, a guest OS in a VEE discerns that it is no longer using one of the virtualized I/O device (e.g., a virtualized USB device/function). Next, at block 504, the guest OS requests the centralized/converged power manager (such as a USB LPM) to suspend the virtualized I/O device.

At block 506, in response, the centralized/converged power manager checks to determine whether any other OS is using the virtualized I/O device. At block 508, the centralized/converged power manager decides to suspend the virtualized I/O device if no other OS is using the virtualized I/O device. At block 510, the centralized/converged power manager then broadcasts the suspension of the virtualized I/O device to all OSes.

At block 512, the virtualized I/O device is suspended. At block 514, the centralized/converged power manager broadcasts the suspend event to all OSes.

Process 600 starts at block 602. At block 602, a guest OS decides it wants to use a suspended virtualized I/O device (e.g., a virtualized USB device/function). At block 604, the guest OS would request the centralized/converged power manager (e.g., a USB LPM manager) to resume the virtualized I/O device.

At block 606, in response, the centralized/converged power manager resumes the previously suspended virtualized I/O device. At block 608, the centralized/converged power manager would broadcast the resume event to all OSes in the VEE.

Figure 7:
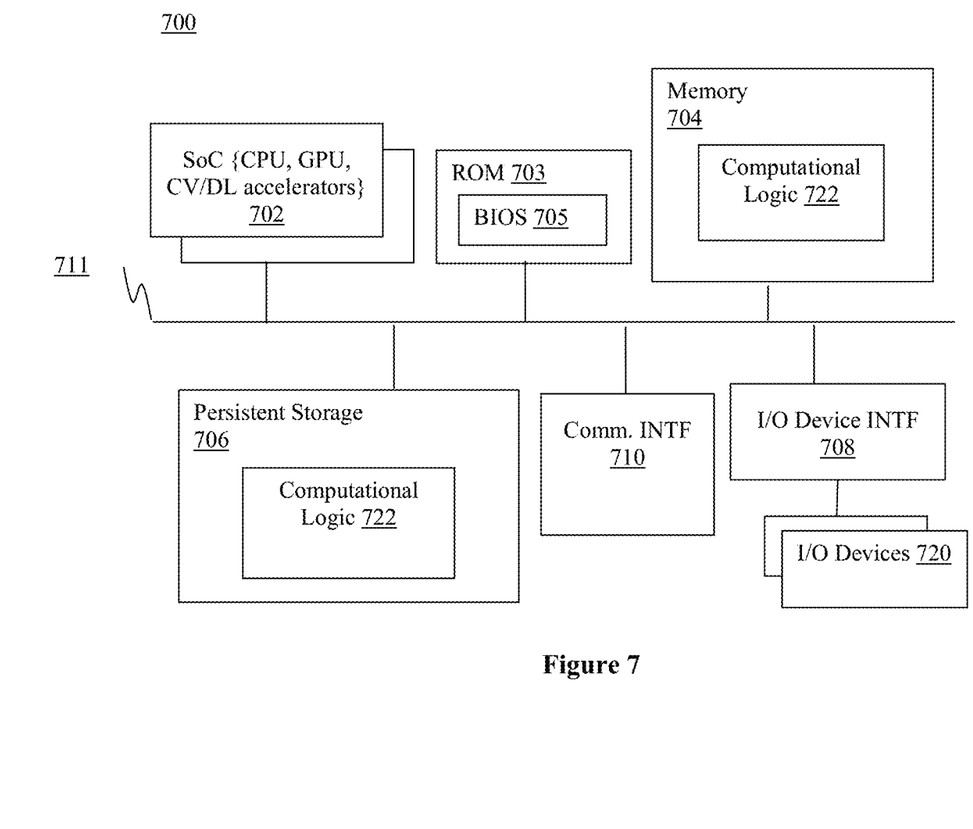
FIG. 7 illustrates a hardware component view of a computer platform suitable for use to practice the present disclosure, according to various embodiments.

Referring now to FIG. 7, wherein an example computing platform that may be suitable for use to practice the present disclosure, according to various embodiments, is illustrated. As shown, computing platform 700 may include one or more system-on-chips (SoCs) 702, ROM 703 and system memory 704. Each SoCs 702 may include one or more processor cores (CPUs), one or more graphics processor units (GPUs), one or more accelerators, such as computer vision (CV) and/or deep learning (DL) accelerators. ROM 703 may include basic input/output system services (BIOS) 705. CPUs, GPUs, and CV/DL accelerators may be any one of a number of these elements known in the art. Similarly, ROM 703 and BIOS 705 may be any one of a number of ROM and BIOS known in the art, and system memory 704 may be any one of a number of volatile storage known in the art.

Additionally, computing platform 700 may include persistent storage devices 706. Example of persistent storage devices 706 may include, but are not limited to, flash drives, hard drives, compact disc read-only memory (CD-ROM) and so forth. Further, computing platform 700 may include one or more input/output (I/O) interfaces 708 to interface with one or more I/O devices 720, such as USB devices, which may be I/O devices 104-106 of FIG. 1, I/O devices 210 of FIG. 2, USB devices 310a-310d of FIG. 3, and/or USB headset 442 of FIG. 4. Other example I/O devices may include, but are not limited to, display, keyboard, cursor control and so forth. Computing platform 700 may also include one or more communication interfaces 710 (such as network interface cards, modems and so forth). Communication devices may include any number of communication devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 711, which may represent one or more buses. In the case of multiple buses, they may be bridged by one or more bus bridges (not shown).

Each of these elements may perform its conventional functions known in the art. In particular, ROM 703 may include 81057405 having a boot loader. System memory 704 and mass storage devices 706 may be employed to store a working copy and a permanent copy of the programming instructions implementing the operations associated with OSes 206-208 of FIG. 2, OSes 306-308 of FIG. 3, OSes 404-408 of FIG. 4, and components of the power management technology of the present disclosure (such as, power management technology 110 of FIG. 1, power manager 212 of FIG. 2, converged LPM manager of FIG. 3, or centralized LPM of manager of FIG. 4), collectively referred to as computational logic 722. The various elements may be implemented by assembler instructions supported by processor core(s) of SoCs 702 or high-level languages, such as, for example, C, that can be compiled into such instructions.

Figure 8:
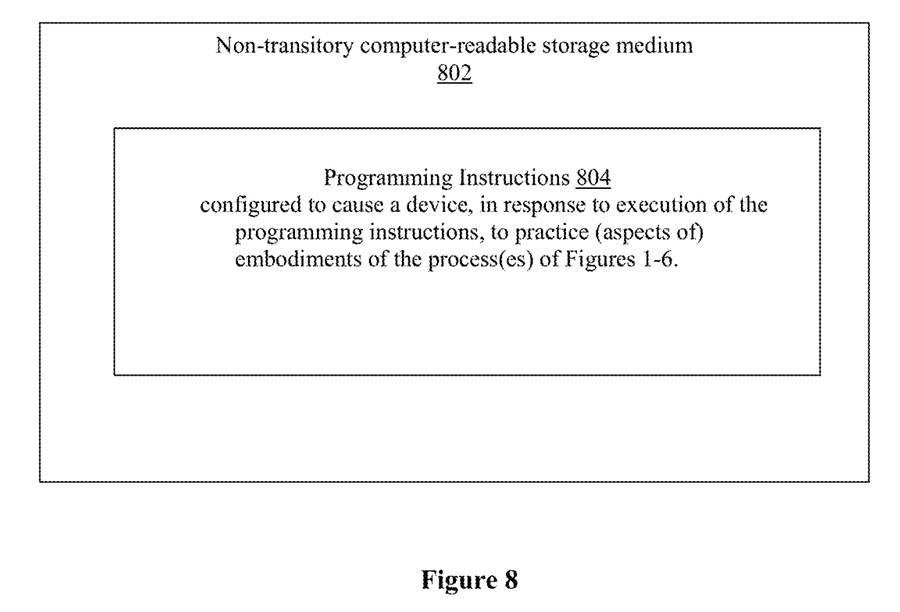
FIG. 8 illustrates a storage medium having instructions for practicing methods described with references to FIGS. 1-6, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 1204. Programming instructions 804 may be configured to enable a device, e.g., computing platform 700, in response to execution of the programming instructions, to implement (aspects of) with OSes 206-208 of FIG. 2, OSes 306-308 of FIG. 3, OSes 404-408 of FIG. 4, and components of the power management technology of the present disclosure (such as, power management technology 110 of FIG. 1, power manager 212 of FIG. 2, converged LPM manager of FIG. 3, centralized LPM of manager of FIG. 4). In alternate embodiments, programming instructions 804 may be disposed on multiple computer-readable non-transitory storage media 802 instead. In still other embodiments, programming instructions 804 may be disposed on computer-readable transitory storage media 802, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is at least one computer-readable medium (CRM) having stored there in a plurality of instructions to cause a computing device, in response to execution of the instructions, to operate a power manager to: receive a request from a first operating system (OS) of a virtualized execution environment (VEE) of the computing device to suspend a first input/output (I/O) device of the computing device, the computing device having a plurality of I/O ports for receiving a plurality of I/O devices including the first I/O device, and the plurality of I/O ports being virtualized for a plurality of OSes of the VEE, including the first OS; and in response to the receipt, conditionally suspend the first I/O device if no other guest OS of the VEE is using the first I/O device.

Example 2 is example 1, wherein to conditionally suspend the first I/O device includes to determine whether any other OS of the VEE is using the first I/O device.

Example 3 is example 1, wherein on suspension of the first I/O device, the power manager is to further broadcast the suspension of the first I/O device to all OSes of the VEE.

Example 4 is example 1, wherein the power manager is further to: receive a request from a second OS of the VEE, after the first I/O device has been suspended, to use the suspended first I/O device; and in response to the request to use the suspended first I/O device, resume the first I/O device, and on resumption, broadcast the resumption of the first I/O device to all OSes of the VEE.

Example 5 is example 4, wherein the first and second guest OS are the same OS.

Example 6 is example 1, wherein the power manager is part of the first OS.

Example 7 is example 1, wherein the power manager is part of one of the other OSes.

Example 8 is example 1, wherein the plurality of OSes are guest OSes of corresponding virtual machines, or are OSes of corresponding containers.

Example 9 is example 8, wherein the power manager is part of a Virtual Machine Monitor (VMM) or a docker of the computing device, arranged to manage operation of the plurality of VMs or the plurality of containers.

Example 10 is any one of examples 1-9, wherein the plurality of I/O ports are Universal Serial Bus (USB) ports, and the plurality of I/O devices are USB devices of a same or different types; and wherein the power manager is a centralized link power management manager.

Example 11 is at least one computer-readable medium (CRM) having stored there in a plurality of instructions to cause a computing device, in response to execution of the instructions, to operate a power manager to: receive a request from a first operating system (OS) of a virtualized execution environment (VEE) of the computing device to use a first input/output (I/O) device that has been suspended, the computing device having a plurality of I/O ports for receiving a plurality of I/O devices including the first I/O device, and the plurality of I/O ports being virtualized for a plurality of OSes of the VEE, including the first OS; and in response to the request to use the suspended first I/O device, resume the first I/O device, and on resumption, broadcast the resumption of the first I/O device to all OSes of the VEE.

Example 12 is example 11, wherein the power manager is part of the first OS.

Example 13 is example 11, wherein the power manager is part of one of the other OS or other OSes.

Example 14 is example 11, wherein the plurality of OSes are guest OSes of corresponding virtual machines, or are OSes of corresponding containers.

Example 15 is example 14, wherein the power manager is part of a Virtual Machine Monitor (VMM) or a docker of the computing device, arranged to manage operation of the plurality of VMs or the plurality of containers.

Example 16 is any one of examples 11-15, wherein the plurality of I/O ports are Universal Serial Bus (USB) ports, and the plurality of I/O devices are USB devices of a same or different types; and wherein the power manager is a centralized link power management manager.

Example 17 is a computing platform, comprising: one or more processors; non-volatile storage; a plurality of universal serial bus (USB) ports to correspondingly receive a plurality of USB devices, which are virtualized for a plurality of OSes of a virtualized execution environment (VEE) hosted by the one or more processors; and one or more buses to which the one or more processors, non-volatile storage, and the plurality of USB ports are coupled, including a USB; wherein the non-volatile storage include a USB link power management (LPM) manager to manage power consumption of the USB devices; wherein the USB LPM manager suspends a USB device only when it is not used by any one of the OSes.

Example 18 is example 17, wherein the USB LPM manager is arranged to receive a request from a first of the plurality of OS to suspend a first link of the plurality of USB devices, if the first OS no longer uses the first link; and in response to the request, the USB LPM manager is to conditionally suspend the first USB link only if no other OS of the VEE is using the first USB link.

Example 19 is example 18, wherein to conditionally suspend the first USB link includes to determine whether any other OS of the VEE is using the first USB link.

Example 20 is example 19, wherein on suspension of the first USB link, the USB LPM manager is to further broadcast the suspension of the first USB link to all OSes of the VEE.

Example 21 is example 17, wherein the USB LPM manager is arranged to receive a request from a first of the plurality of OSes of the VEE, after the first USB device has been suspended, to use the suspended first USB device; and in response to the request to use the suspended first USB device, resume the first USB device, and on resumption, broadcast the resumption of the first USB device to all OSes of the VEE.

Example 22 is example 17, wherein the USB LPM manager is part of one of the plurality of OSes.

Example 23 is any one of examples 17-22, wherein the plurality of OSes are guest OSes of corresponding virtual machines (VMs), or are OSes of corresponding containers; and wherein the USB LPM manager is part of a Virtual Machine Monitor (VMM) or a docker of the computing platform, arranged to manage operation of the plurality of VM or the plurality of containers.

Example 24 is a method for managing power consumption of virtualized universal serial bus (USB) devices in a virtualized execution environment (VEE), comprising: receiving, by a centralized link power management (LPM) manager of the VEE, a request from a first of a plurality of OSes of the VEE to suspend a first link of a first of the virtualized USB devices; determining, by the centralized LPM manager, whether the first link of the first virtualized USB device is not used by any of the OSes; on determining that the first link of the first virtualized USB device is not used by any of the OSes, causing, by the centralized LPM manager, the first link of the first virtualized USB device to be suspended; and on suspension of the first link of the first virtualized I/O device, broadcasting, by the centralized power manager, the suspension event to all OSes of the VEE.

Example 25 is example 24, further comprising: receiving, by the centralized power manager of the VEE, a request from a second of the plurality of OSes to resume the suspended first link of the first virtualized I/O device; resuming, by the centralized power manager, the suspended first link of the first virtualized I/O device; and on resumption of the first link of the first virtualized I/O device, broadcasting, by the centralized LPM manager, the suspension event to all OSes of the VEE.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. At least one non-transitory computer-readable medium (CRM) having stored there in a plurality of instructions to cause a computing device, in response to execution of the instructions, to operate a Universal Serial Bus (USB) link power management (LPM) manager within a host operating system (OS) of the computing device, for a USB bus master of the host OS, the host OS hosting a plurality of guest containers of the host OS, wherein the USB LPM manager is to:
   receive a USB LPM state notifier from a first guest container of the plurality of guest containers of the host OS requesting suspension of a first USB device or function of the computing device, the USB device or function having been previously exposed from the host OS to the first guest container in a passthrough mode, and the computing device having a plurality of USB devices or functions, including the first USB device or function exposed to the first guest container in the passthrough mode; and
   in response to the receipt, conditionally suspend the first USB device or function taking into consideration whether the host OS is using the first USB device or function or not.

2. The non-transitory CRM of claim 1, wherein to conditionally suspend the first USB device or function further includes to determine whether any other guest container of the host OS is using the first USB device or function.

3. The non-transitory CRM of claim 1, wherein on suspension of the first USB device or function, the LPM manager is to further broadcast the suspension of the first USB device or function to all guest containers of the host OS.

4. The non-transitory CRM of claim 1, wherein the LPM manager is further to:
   receive another USB LPM state notifier from a second guest container of the host OS, after the first USB device or function has been suspended, to use the suspended first USB device or function; and
   in response to the other USB LPM state notifier to use the suspended first USB device or function, resume the first USB device or function, and on resumption, expose the first USB device or function to the second guest container in the passthrough mode, and issue a USB broadcast event about the resumption of the first USB device or function to all guest containers of the host OS.

5. The non-transitory CRM of claim 1, wherein the plurality of USB devices or functions are USB devices or functions of different types or of different USB versions.

6. At least one non-transitory computer-readable medium (CRM) having stored there in a plurality of instructions to cause a computing device, in response to execution of the instructions, to operate a Universal Serial Bus (USB) link power management (LPM) manager for a USB bus master of a host operating system (OS) of the computing device, to:
   receive a USB LPM state notifier from a first guest container of the host OS requesting usage of a first USB device or function that has been suspended, the computing device having a plurality of USB devices or functions, including the first USB device or function for shared use by a plurality of guest containers of the host OS, including the first guest container; and
   in response to the request to use the suspended first USB device or function, resume the first USB device or function, and on resumption, expose the first USB device or function to the first guest container in a passthrough mode, and issue a USB broadcast event on the resumption of the first USB device or function to all guest containers of the host OS.

7. The non-transitory CRM of claim 6, wherein the plurality of USB devices or functions are USB devices or functions of different types or of different USB versions.

8. A computing platform, comprising:
one or more processors;
non-volatile storage;
a plurality of universal serial bus (USB) devices or functions;
one or more buses to which the one or more processors, non-volatile storage, and a plurality of USB ports are coupled, including a USB; and
a host operating system (OS) having a USB master;
wherein the host OS is configured to host a plurality of guest containers, and facilitate shared use of the USB devices or functions by the plurality of guest containers through selective exposure of the USB devices or functions to the plurality of guest containers who want to use selected ones of the USB devices or functions in a passthrough mode; and
wherein the host OS includes a USB link power management (LPM) manager to manage power consumption of the USB devices or functions, and the USB LPM manager is configured to suspend a particular USB device or function exposed to one of the guest containers in the passthrough mode, taking into consideration whether the particular USB device or function is also not used by the host OS or any one of the guest containers of the host OS.

9. The computing platform of claim 8, wherein the USB LPM manager is arranged to receive a USB LPM state notifier from a first of the plurality of guest containers requesting suspension of a first of the plurality of USB devices or function exposed to the first guest container in the passthrough mode, when the first guest container no longer uses the first USB device or function; and in response to the USB LPM state notifier, the USB LPM manager is to conditionally suspend the first USB device or function, taking into consideration whether the host OS or any other guest container is using the first USB device or function.

10. The computing platform of claim 9, wherein on suspension of the first USB device or function, the USB LPM manager is to further issue a USB broadcast event on the suspension of the first USB device or function to all the guest containers of the host OS.

11. The computing platform of claim 8, wherein the USB LPM manager is arranged to receive a USB LPM state notifier from a first of the plurality of guest containers of the host OS, after the first USB device or function has been suspended, to use the suspended first USB device or function; and in response to the request to use the suspended first USB device or function, resume the first USB device or function, and on resumption, expose the first USB device or function to the first guest container in a passthrough mode, and issue a USB broadcast event about the resumption of the first USB device or function to all guest containers of the host OS.

12. A method for managing power consumption of shared universal serial bus (USB) devices or functions, comprising:
receiving, by a USB link power management (LPM) manager of a bus master of a host operating system (OS), a USB LPM state notifier from a first of a plurality of guest containers of the host OS requesting suspension of a first of the shared USB devices or functions exposed to the first guest container in a passthrough mode;
determining, by the USB LPM manager, whether the first shared USB device or function is not used by the host OS or any of the guest containers of the host OS;
on determining that the first shared USB device or function is not used by the host OS or any of the guest containers, causing, by the USB LPM manager, the first shared USB device or function to be suspended; and
on suspension of the first shared USB device or function, issuing a USB broadcast event on the suspension of the first shared USB device or function, by the USB LPM manager, to all guest containers of the host OS.

13. The method of claim 12, further comprising:
receiving, by the USB LPM manager, a request from a second of the plurality of guest containers to resume the suspended first shared USB device or function;
resuming, by the USB LPM manager, the suspended first shared USB device or function; and
on resumption of the first shared USB device or function, exposing the first shared USB device or function to the second guest container in the passthrough mode, and issuing a USB broadcast event on the resumption, by the LPM manager, to all guest containers of the host OS.

* * * * *

UNITED STATES PATENT AND TRADEMARK OFFICE
CERTIFICATE OF CORRECTION

| | |
|---|---|
| PATENT NO. | : 11,157,289 B2 |
| APPLICATION NO. | : 16/410689 |
| DATED | : October 26, 2021 |
| INVENTOR(S) | : Saranya Gopal, Rajaram Regupathy and Peter Ewert |

It is certified that error appears in the above-identified patent and that said Letters Patent is hereby corrected as shown below:

In the Claims

Column 16
Line 46, "… stored there in" should read --… stored therein--

Column 17
Line 30, "… function exposed" should read --… functions exposed--

Signed and Sealed this
Twenty-eighth Day of March, 2023

Katherine Kelly Vidal
*Director of the United States Patent and Trademark Office*